(12) United States Patent
Yoshida et al.

(10) Patent No.: US 10,483,541 B2
(45) Date of Patent: Nov. 19, 2019

(54) METHOD OF PRODUCING NICKEL-COBALT COMPOSITE HYDROXIDE AND METHOD OF PRODUCING POSITIVE ELECTRODE ACTIVE MATERIAL FOR NON-AQUEOUS ELECTROLYTE SECONDARY BATTERY

(71) Applicant: NICHIA CORPORATION, Anan-shi, Tokushima (JP)

(72) Inventors: Hideki Yoshida, Tokushima (JP); Masato Sonoo, Komatsushima (JP); Takahiro Kitagawa, Tokushima (JP)

(73) Assignee: NICHIA CORPORATION, Anan-shi (JP)

( * ) Notice: Subject to any disclaimer, the term of this patent is extended or adjusted under 35 U.S.C. 154(b) by 0 days.

(21) Appl. No.: 15/588,970

(22) Filed: May 8, 2017

(65) Prior Publication Data
US 2017/0324092 A1 Nov. 9, 2017

(30) Foreign Application Priority Data

May 9, 2016 (JP) .................. 2016-093544
Apr. 27, 2017 (JP) .................. 2017-088613

(51) Int. Cl.
*H01M 4/525* (2010.01)
*C01G 53/00* (2006.01)
*H01M 4/02* (2006.01)

(52) U.S. Cl.
CPC .......... *H01M 4/525* (2013.01); *C01G 53/006* (2013.01); *C01G 53/42* (2013.01); *C01G 53/50* (2013.01);
(Continued)

(58) Field of Classification Search
None
See application file for complete search history.

(56) References Cited

U.S. PATENT DOCUMENTS 5,153,081 A 10/1992 Thackeray et al.
5,240,794 A 8/1993 Thackeray et al.
(Continued)

FOREIGN PATENT DOCUMENTS

JP H0837007 A 2/1996
JP H8171935 A 7/1996
(Continued)

OTHER PUBLICATIONS

C. Delmas et al., Electrochemical & Physical Properties of LixNi1—yCoyO2 Phases, 53-56 Solid State Ionics 370, 370 (1992).
(Continued)

*Primary Examiner* — Christopher P Domone
(74) *Attorney, Agent, or Firm* — Hunton Andrews Kurth LLP

(57) ABSTRACT

A method of producing a nickel-cobalt composite hydroxide includes: preparing a first solution containing nickel ions and cobalt ions; preparing a second solution containing tungsten ions and having a pH of 10 or more; preparing a third solution containing a complex ion-forming factor; preparing a liquid medium having a pH in a range of 10 to 13.5; supplying the first solution, the second solution, and the third solution separately and simultaneously to the liquid medium to obtain a reacted solution having a pH in a range of 10 to 13.5; and obtaining the nickel-cobalt composite hydroxide containing nickel, cobalt, and tungsten from the reacted solution.

15 Claims, 4 Drawing Sheets

(52) U.S. Cl.
CPC ........... *H01M 4/02* (2013.01); *C01P 2002/85* (2013.01); *C01P 2004/04* (2013.01); *H01M 2004/028* (2013.01)

(56) References Cited

U.S. PATENT DOCUMENTS

| | | | |
|---|---|---|---|
| 5,955,219 | A | 9/1999 | Nishijima et al. |
| 6,017,654 | A | 1/2000 | Kumta et al. |
| 6,214,493 | B1 | 4/2001 | Bruce et al. |
| 6,333,128 | B1 | 12/2001 | Sunagawa et al. |
| 6,551,743 | B1 | 4/2003 | Nakanishi et al. |
| 6,677,082 | B2 | 1/2004 | Thackeray et al. |
| 6,680,143 | B2 | 1/2004 | Thackeray et al. |
| 7,049,031 | B2 | 5/2006 | Johnson et al. |
| 7,135,252 | B2 | 11/2006 | Thackeray et al. |
| 7,205,072 | B2 | 4/2007 | Kang et al. |
| 7,314,682 | B2 | 1/2008 | Thackeray et al. |
| 7,314,684 | B2 | 1/2008 | Kang et al. |
| 7,393,476 | B2 | 7/2008 | Shiozaki et al. |
| 7,435,402 | B2 | 10/2008 | Kang et al. |
| 7,468,223 | B2 | 12/2008 | Thackeray et al. |
| 7,732,096 | B2 | 6/2010 | Thackeray et al. |
| 9,293,236 | B2 | 3/2016 | Kawakami et al. |
| 9,780,370 | B2 | 10/2017 | Lee et al. |
| 2002/0022183 | A1 | 2/2002 | Ogawa et al. |
| 2006/0083989 | A1 | 4/2006 | Suhara et al. |
| 2007/0003834 | A1 | 1/2007 | Gao et al. |
| 2009/0127520 | A1 | 5/2009 | Whitfield et al. |
| 2012/0270107 | A1 | 10/2012 | Toya et al. |
| 2014/0205901 | A1 | 7/2014 | Nagai et al. |
| 2015/0364759 | A1* | 12/2015 | Kase ............... C01G 53/00 429/220 |
| 2016/0093885 | A1 | 3/2016 | Kamata et al. |
| 2016/0164093 | A1* | 6/2016 | Inoue ............... C01G 53/50 429/223 |
| 2017/0207453 | A1 | 7/2017 | Oda |

FOREIGN PATENT DOCUMENTS

| | | |
|---|---|---|
| JP | H08213015 A | 8/1996 |
| JP | H8273665 A | 10/1996 |
| JP | H8315819 A | 11/1996 |
| JP | H0955211 A | 2/1997 |
| JP | H9296538 A | 11/1997 |
| JP | H10106543 A | 4/1998 |
| JP | H10188982 A | 7/1998 |
| JP | H11307094 A | 11/1999 |
| JP | 200012090 A | 1/2000 |
| JP | 2000077072 A | 3/2000 |
| JP | 2002063903 A | 2/2002 |
| JP | 2011-116580 A | 6/2011 |
| JP | 2012252964 A | 12/2012 |
| JP | 2013-051172 A | 3/2013 |
| JP | 2015-026455 A | 2/2015 |
| JP | 2016-094307 A | 5/2016 |
| JP | 2016-154143 A | 8/2016 |
| WO | 0029331 A1 | 5/2000 |
| WO | 2004-092073 A1 | 10/2004 |
| WO | 2007129848 A1 | 11/2007 |
| WO | WO2014119165 * | 8/2014 |
| WO | 2015012284 A1 | 1/2015 |
| WO | WO2015012284 * | 1/2015 |
| WO | 2016017783 A1 | 2/2016 |

OTHER PUBLICATIONS

Gates Energy Products, Inc., "Section 2: Rechargeable Cells and Batteries" Rechargeable Batteries Applications Handbook, Butterworth-Heinemann, Newton, MA, pp. 10-11, (1998).

Jang et al., "Stabilization of LiMnO2 in the ?-NaFeO2 Structure Type by LiAlO2 Addition," Electrochemical and Solid State Letters, vol. 1, No. 1, pp. 13-16 (1998).

Ohzuku et al., Synthesis and Characterization of LiAl1/4Ni3/4O2 (R3m) for Lithium-Ion (Shuttlecock) Batteries, 142 J. Electrochem. Soc. 4033 (Dec. 1995).

Numata et al., "Synthesis of Solid Solutions in a System of LiCoO2—Li2MnO3 for Cathode Materials of Secondary Lithium Batteries," Chemistry Letters (1997), pp. 725-726 ("Numata").

Numata, et al., "Synthesis and characterization of layer structured solid solutions in the system LiCoO2—Li2MnO3," Solid State Ionics, 117 ( 1999): 257-263.

Rossen et al., "Structure and Electrochemistry of LixMnyNi1—yO2," Solid State Ionics, vol. 57, Issues 3-4, Oct. 1992, pp. 311-318 ("Rossen").

Thackeray, "Lithiated Oxides for Lithium-Ion Batteries," The 186th meeting, the Electrochemical Society Symposium, Oct. 9-14, 1994, Miami Beach, Florida, published on Jan. 1, 1995 ("Thackeray 1994").

Excerpts from Linden, Handbook of Batteries, 2nd Edition (1995), pp. 1.3-1.5, 36.4-36.17, 36.22-36.27, 36.42-36.59, A.1, A.2, A.7, A.8.

Kaewmala et al., "Li2MnO3 domain size and current rate dependence on the electrochemical properties of 0.5Li2MnO3—0.5LiCoO2 cathode material," Scientific Reports.

Rossouw et al., "Synthesis and Structural Characterization of a Novel Layered Lithium Manganese Oxide, Li0.36Mn0.91 O2 , and its Lithiated Derivative, Li1.09Mn0.91 O2 ," Journal of Solid State Chem., vol. 104, pp. 464-466 (1993).

Yoshio et al., "Preparation of LiYMnxNi1_xO2 as a cathode for lithium-ion batteries," Journal of Power Sources 74 (1998) 46-53.

Spahr et al., Characterization of Layered Lithium Nickel Manganese Oxides Synthesized by a Novel Oxidative Coprecipitation Method and Their Electrochemical Performance as Lithium Insertion Electrode Materials, J. Electrochem. Soc., vol. 145, No. 4, Apr. 1998.

Armstrong et al., Synthesis of layered LiMnO2 as an electrode for rechargeable lithium batteries.

Neudecker et al., "Lithium Manganese Nickel Oxides Lix(MnyNi1—y)2—xO2, Part 1 Synthesis and Characterization of Thin Films and Bulk Phases, and Part 2 Electrochemical Studies on Thin-Film Batteries," J. Electrochem. Soc., 1998, 145:4148-4168.

Thackeray et al., "Li2MnO3-stabilized LiMO2 (M=Mn,Ni, Co) electrodes for lithium-ion batteries," J. Mater.Chem., vol. 17, pp. 3112-3125 (2007) ("Thackeray 2007").

Rossouw et al., Lithium Manganese Oxides from Li2Mn03 for Rechargeable Lithium Battery Applications, Mat. Res. Bull., vol. 26, pp. 463-473, 1991.

* cited by examiner

METHOD OF PRODUCING NICKEL-COBALT COMPOSITE HYDROXIDE AND METHOD OF PRODUCING POSITIVE ELECTRODE ACTIVE MATERIAL FOR NON-AQUEOUS ELECTROLYTE SECONDARY BATTERY

CROSS-REFERENCE TO RELATED APPLICATIONS

This application claims the benefit of Japanese Patent Application No. 2016-093544, filed on May 9, 2016, and Japanese Patent Application No. 2017-88613, filed on Apr. 27, 2017, the disclosures of which are hereby incorporated by reference in their entirety.

BACKGROUND

Technical Field

The present invention relates to a method of producing a nickel-cobalt composite hydroxide and a method of producing a positive electrode active material for a non-aqueous electrolyte secondary battery.

Description of the Related Art

In recent years, with the miniaturization of electronic devices such as cellular phones, and increasing demand for these devices, secondary batteries as a power source for these electronic devices are required to have higher energy density. Non-aqueous electrolyte secondary batteries, such as lithium ion secondary batteries, are expected to meet such a demand. For the positive electrode active material of a lithium ion secondary battery, a lithium transition metal complex oxide having a layered structure, such as lithium cobalt oxide, lithium nickel oxide, and lithium nickel cobalt manganese oxide, is used.

Examples of methods of producing a nickel-cobalt composite hydroxide, which is a precursor for the above-described lithium transition metal complex oxide, include a coprecipitation method. Japanese Patent Application Publication No. JP 2011-116580 A describes a method of producing a nickel-cobalt composite hydroxide including coprecipitating an additional element with nickel, cobalt, and manganese in a solution containing nickel, cobalt, manganese, so that the additional element is uniformly present in the interiors of the secondary particles of the nickel-cobalt composite hydroxide.

SUMMARY

A method of producing a nickel-cobalt composite hydroxide includes preparing a first solution that contains nickel ions and cobalt ions; preparing a second solution that contains tungsten ions and has a pH of 10 or more; preparing a third solution that contains a complex ion-forming factor; preparing a liquid medium that has a pH in a range of 10 to 13.5; supplying the first solution, the second solution, and the third solution separately and simultaneously to the liquid medium to obtain a reacted solution having a pH in a range of 10 to 13.5; and obtaining a composite hydroxide that contains nickel, cobalt, and tungsten from the reacted solution.

DETAILED DESCRIPTION

A method of producing a nickel-cobalt composite hydroxide according to an embodiment of the present disclosure includes preparing a first solution that contains nickel ions and cobalt ions; preparing a second solution that contains tungsten ions and has a pH of 10 or more; preparing a third solution that contains a complex ion-forming factor; preparing a liquid medium that has a pH in a range of 10 to 13.5; supplying the first solution, the second solution, and the third solution separately and simultaneously to the liquid medium to obtain a reacted solution having a pH that is in a range of 10 to 13.5; and obtaining a composite hydroxide that contains nickel, cobalt, and tungsten from the reacted solution.

A method of producing a positive electrode active material for a non-aqueous electrolyte secondary battery according to an embodiment of the present disclosure includes: heat-treating the nickel-cobalt composite hydroxide, which is obtained by the above-described method of producing a nickel-cobalt composite hydroxide, in the presence of oxygen to obtain a heat-treated product; mixing the heat-treated product and a lithium compound to obtain a lithium mixture; and heat-treating the lithium mixture to obtain a lithium-transition metal composite oxide containing nickel and cobalt and having a layered structure.

Certain embodiments of the present invention allow for providing a method of producing a nickel-cobalt composite hydroxide that uniformly contains tungsten on the surfaces and in the interiors of its primary particles and a method of producing a positive electrode active material for a non-aqueous electrolyte secondary battery using the nickel-cobalt composite hydroxide obtained by the method.

Certain embodiments of the present invention will be described below in detail. The embodiments described below, however, are mere examples for embodying the technical idea of the present invention, and the present invention is not limited to the embodiments described below. In the present disclosure, the term "step" refers to not only an independent step but also a step which cannot be clearly distinguished from the other steps but that can achieve the desired object of the step. In the case where a plurality of substances corresponds to a component in the composition, the amount of the component refers the total amount of the plurality of substances present in the composition unless otherwise specified.

Figure 1:
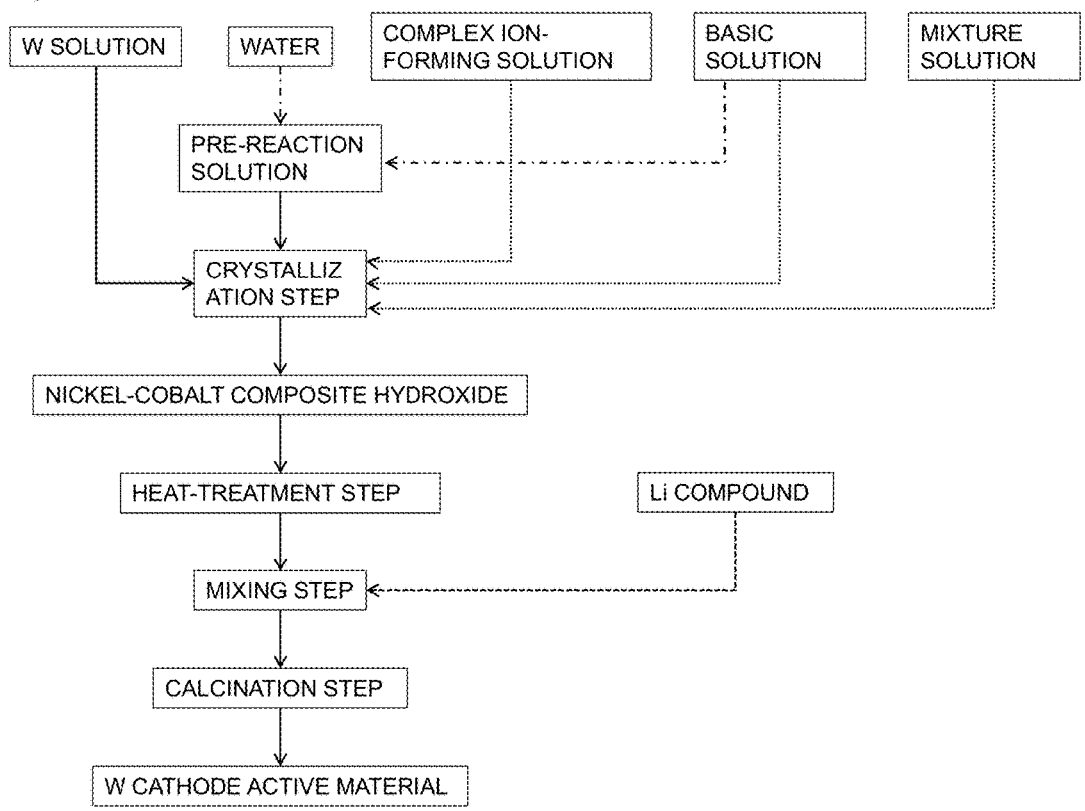
FIG. 1 is a schematic flowchart of a method of producing a positive electrode active material according to an embodiment of the present disclosure.

Method of Producing Positive Electrode Active Material for Non-Aqueous Electrolyte Secondary Battery FIG. 1 is a schematic flowchart illustrating a method of producing a positive electrode active material according to an embodiment of the present disclosure. Referring to FIG. 1, the method of producing a nickel-cobalt composite hydroxide and the method of producing a positive electrode active material for a non-aqueous electrolyte secondary battery will be described.

A first solution containing nickel and cobalt (hereinafter also referred to as "mixed solution"), and a second solution (hereinafter also referred to as "W solution") containing tungsten and having a pH of 10 or more at 25° C. (hereinafter, the pHs are the values measured at a liquid temperature of 25° C.), a third solution containing a complex ion-forming factor (hereinafter also referred to as "complex ion-forming solution"), and a liquid medium having a pH in a range of 10 to 13.5 (hereinafter also referred to as "pre-reaction solution") are prepared. Subsequently, in a crystallization step, the mixed solution, the W solution, and the complex ion-forming solution are separately and simultaneously supplied to the pre-reaction solution to produce a reacted solution. During the crystallization step, the pH of the reacted solution is maintained in a range of 10 to 13.5. From the reacted solution, a composite hydroxide containing nickel, cobalt, and tungsten is obtained. Through these steps, a nickel-cobalt composite hydroxide made of secondary particles, each of which is an aggregate of the primary particles, is produced. Subsequently, in a heat-treatment step, the thus obtained composite hydroxide containing nickel, cobalt, and tungsten is heat-treated to obtain a heat-treated product. Subsequently, in a mixing step, the heat-treated product and a lithium compound are mixed together to obtain a lithium mixture. Subsequently, in a calcination step, the lithium mixture is calcined to obtain a lithium-transition metal composite oxide containing nickel and cobalt and having a layered structure. Through these steps, a positive electrode active material for a non-aqueous electrolyte secondary battery is produced.

In the present embodiment, during the crystallization step, the mixed solution, the W solution, and the complex ion-forming solution are supplied separately and simultaneously to the pre-reaction solution while maintaining the pH of the reacted solution to be produced in a range of 10 to 13.5. This allows for producing a composite hydroxide containing nickel, cobalt, and tungsten in which tungsten is further uniformly distributed. Such a composite hydroxide having uniformly distributed tungsten can be suitably used for producing a positive electrode active material. The reason for this will be described below.

Under a basic composition, tungsten is not deposited as a hydroxide of tungsten, but deposited as a compound of tungsten (e.g., $NiWO_4$) with a metal element (in the description below, an example in which nickel is used for the metal element is explained) contained in the mixed solution, and is incorporated into the surfaces and the interiors of the primary particles, which are made of a composite hydroxide. Thus, if the mixed solution and the W solution are mixed together beforehand and supplied to the pre-reaction solution, the concentration of nickel ions is increased around tungsten ions. Accordingly, the deposition rate of the compound of tungsten is increased. This may easily cause segregation of tungsten on the surfaces and in the interiors of the primary particles. However, as in the present embodiment, in the case where the mixed solution and the W solution are separately supplied to the pre-reaction solution, nickel hydroxide is deposited in the region where the mixed solution is supplied, regardless of the presence of tungsten ions. This can prevent high concentration of nickel ions in the reacted solution. Thus, nickel-containing tungsten compound is hardly deposited. Meanwhile, the deposited nickel hydroxide is reacted with a complex ion-forming factor, which is contained in the complex ion-forming solution, and is slowly re-eluted as nickel complex ions. The re-eluted nickel complex ions and tungsten is then reacted with each other, so that a tungsten compound is deposited. The concentration of the re-eluted nickel complex ions is relatively low, which allows the deposition rate of the tungsten compound to be decreased. It is considered that separately supplying the mixed solution and the W solution to the pre-reaction solution to obtain a reacted solution allows tungsten to be more uniformly present on the surfaces and in the interiors of the primary particles of the composite hydroxide.

If the W solution has a pH of less than 10, the pH of the reacted solution becomes locally low in the region where the W solution is supplied. In the region having a locally low pH, the once deposited nickel hydroxide may be dissolved again. With this redissolution, concentration of nickel around tungsten in the region having a locally low pH in the reacted solution is increased, which accelerates the deposition rate of the tungsten compound. This is considered to cause the segregation of tungsten on the surfaces and in the interiors of the primary particles. For these reasons, adjustment of the pH of the W solution to 10 or more is believed to decelerate the deposition rate of the tungsten compound, and allows more uniform distribution of tungsten in the primary particles.

The steps will be described below.

Preparation of Mixture Solution

The mixed solution is prepared by dissolving a salt that contains metals except for tungsten into a predetermined amount of water in accordance with the composition of the intended lithium transition metal oxide. Examples of such a salt include nitrate, sulfate, and hydrochloride. To facilitate dissolution of the salt containing metals in the preparing of the mixed solution, an acidic solution (e.g., an aqueous solution of sulfuric acid) may be added to water. In this case, a basic solution may be further added to adjust the pH. The total number of moles of the metal elements, such as nickel, in the mixed solution can be appropriately selected in accordance with the average particle diameter of the intended lithium transition metal oxide. The expression "total number of moles of the metal elements" in the present specification refers to the total number of moles of nickel and cobalt in the case where the mixed solution contains nickel and cobalt, and refers to the total number of moles of nickel, cobalt, and manganese in the case where the mixed solution contains nickel, cobalt, and manganese.

The concentration of a total of all metal ions, such as nickel, in the mixed solution is, 1.0 mol/L to 2.6 mol/L, and preferably 1.5 mol/L to 2.2 mol/L. With the concentration of the metal ions in the mixed solution of 1.0 mol/L or more, a sufficient amount of crystallized substance per reaction vessel can be obtained, so that productivity can be improved. On the other hand, the concentration of the metal ions in the mixed solution of 2.6 mol/L or less does not exceed the saturating concentration of the metal salts at a normal temperature. Thus, the decrease in concentration of the metal ions in the mixed solution due to re-deposition of crystals is reduced.

The mixed solution substantially contains no tungsten ions. As used herein, the expression, "substantially contains no tungsten ions" refers to the presence of tungsten ions that is unintentionally mixed into the mixed solution is not excluded. The amount of tungsten ions present in the mixed solution is, for example, 500 ppm or less, and preferably 50 ppm or less.

Preparation of W Solution

The W solution substantially contains tungsten ions alone as metal ions. The W solution is prepared by dissolving a tungsten compound in a basic solution to have a pH of 10 or more in accordance with the intended composition. Examples of the tungsten compound include ammonium paratungstate and sodium tungstate. The number of moles of tungsten in the W solution is appropriately adjusted in accordance with the intended composition of the positive electrode active material and the total number of moles of the metal ions, such as nickel, in the mixed solution. As used herein, the expression "substantially contains tungsten ions alone as metal ions" refers to that the presence of other metal ions unintendedly mixed into the W solution is allowed. The amount of the other metal ions present in the W solution is, for example, 500 ppm or less, and preferably 50 ppm or less relative to the tungsten ions. The tungsten ion concentration in the W solution is, for example, 0.04 mol/L to 1.2 mol/L, and preferably 0.6 mol/L to 1.0 mol/L.

Preparation of Complex Ion-Forming Solution

The complex ion-forming solution contains a complex ion-forming factor that forms a complex ion with a metal element contained in the mixed solution. For example, in the case where the complex ion-forming factor is ammonia, an aqueous solution of ammonia can be used for a complex ion-forming solution. The amount of ammonia contained in the aqueous solution of ammonia is, for example, 5 wt % to 25 wt %, and preferably 10 wt % to 20 wt %.

Preparation of Pre-Reaction Solution

The pre-reaction solution is a liquid medium having a pH of 10 to 13.5. The pre-reaction solution is prepared, for example, by charging a predetermined amount of water and a basic solution, such as an aqueous solution of sodium hydroxide, in a reaction container to have a pH of 10 to 13.5. Adjusting the pH of the solution to 10 to 13.5 can reduce the pH change in the reacted solution during the initial reaction.

Crystallization Step

The mixed solution, the W solution, and the complex ion-forming solution are supplied separately and simultaneously to the pre-reaction solution while maintaining the pH of the reacted solution to be produced in a range of 10 to 13.5. Thus, composite hydroxide particles containing nickel, cobalt, and tungsten can be obtained from the reacted solution. A basic solution may also be simultaneously supplied to the pre-reaction solution in addition to the mixed solution, the W solution, and the complex ion-forming solution. This allows the pH of the reacted solution to be easily maintained in a range of 10 to 13.5.

In the crystallization step, the solutions are preferably supplied so as to maintain the pH of the reacted solution in a range of 10 to 13.5. For example, adjusting the amount of the basic solution to be supplied in accordance with the amount of the mixed solution to be supplied allows the pH of the reacted solution to be maintained in a range of 10 to 13.5. If the pH of the reacted solution is lower than 10, the amount of impurities (e.g., the sulfuric acid portion or nitric acid portion other than the metals contained in the mixed solution) contained in the resultant composite hydroxide is increased. This may lead to reduction in the capacity of the secondary battery, which is the final product. If the pH is more than 13.5, an amount of small secondary particles to be produced is increased, which may make the handling of the resulting composite hydroxide difficult. The temperature of the reacted solution is controlled to be in a range of, for example, 25° C. to 80° C.

In the crystallization step, the concentration of nickel ions in the reacted solution is preferably maintained in a range of 10 ppm to 1000 ppm. With the concentration of nickel ions of 10 ppm or more, a sufficient amount of tungsten compound is deposited. With the concentration of nickel ions of 1000 ppm or less, the amount of nickel to be eluted is reduced, which allows for reducing deviation of the composition to be obtained from the intended composition. In the case where, for example, an aqueous solution of ammonia is used for a complex ion-forming solution, the nickel ion concentration can be adjusted by supplying the complex ion-forming solution such that the ammonium ion concentration in the reacted solution is 1000 ppm to 15000 ppm.

The duration of supply of the mixed solution is preferably 12 hours to 60 hours. Supplying the mixed solution in 12 hours or more allows for decelerating the deposition rate of the tungsten compound. This allows the tungsten to be more uniformly distributed. Supplying the mixed solution in 60 hours or less allows for improving productivity.

A ratio in which the total number of moles of nickel or other metals in the mixed solution to be supplied throughout the crystallization step is assumed as the denominator, and the total number of moles of nickel or other metals in the mixed solution supplied per hour is assumed as the numerator, is preferably in a range of 0.015 to 0.085. With the ratio of 0.015 or greater, the productivity can be improved. With the ratio of 0.085 or smaller, the deposition rate of the tungsten compound is decelerated, which allows the tungsten to be more uniformly distributed. The speed of supply of the W solution is appropriately adjusted in accordance with the speed of supply of the mixed solution and the molar ratio of tungsten in the intended composition.

Upon completion of the reaction, the obtained deposit is washed, filtered, and dried to obtain a nickel-cobalt composite hydroxide. The composition ratio of the metal elements in the resulting nickel-cobalt composite hydroxide is approximately the same as the composition ratio of the metal elements in the lithium-transition metal composite oxide obtained by using the nickel-cobalt composite hydroxide as raw materials.

The nickel-cobalt composite hydroxide according to the present embodiment preferably has a composition represented by, for example, the following formula (1):

$$Ni_{1-x-y}Co_x{}^1M_yW_z(OH)_{2+p} \quad (1)$$

In formula (1), $^1M$ is at least one element selected from the group consisting of Mn, Al, Mg, Ca, Ti, Zr, Nb, Ta, Cr, Mo, Fe, Cu, Si, Sn, Bi, Ga, Y, Sm, Er, Ce, Nd, La, Cd, and Lu; and $0.01 \leq x \leq 0.35$, $0 \leq y \leq 0.35$, $0 < z \leq 0.05$, and $0 \leq p \leq 0.5$ are satisfied. $^1M$ is preferably at least one of Mn and Al, and $0 < y \leq 0.35$ is preferably satisfied.

Seed Formation Step

Figure 2:
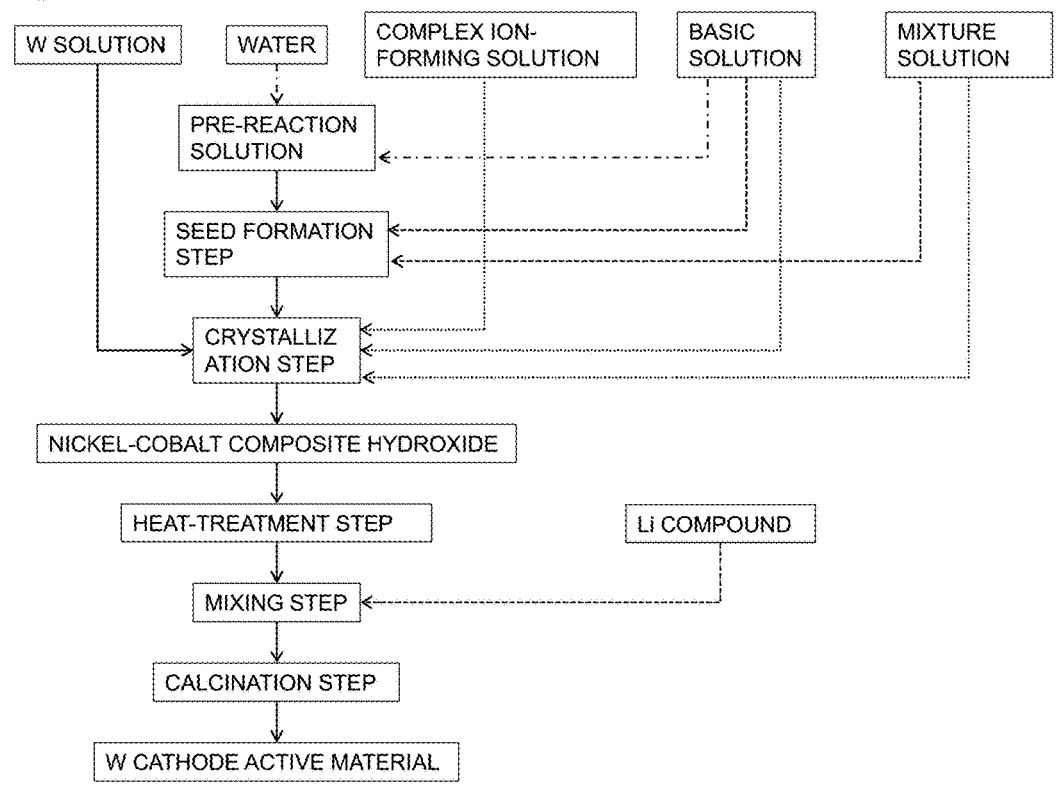
FIG. 2 is a schematic flowchart of a method of producing a positive electrode active material according to another embodiment of the present disclosure.

As shown in FIG. 2, the method of producing a nickel-cobalt composite hydroxide preferably includes a seed formation step before the crystallization step. By supplying a portion of the mixed solution to the pre-reaction solution, a seed solution containing particles of a composite hydroxide that contain nickel and cobalt (hereinafter also referred to as nickel-cobalt-containing composite hydroxide) as a seed crystal can be provided. In other words, in the crystallization step, the seed solution containing a nickel-cobalt-containing composite hydroxide is preferably used for the liquid medium. One particle of the nickel-cobalt-containing composite hydroxide obtained in the seed formation step serves as a seed crystal forming one particle of the composite hydroxide obtained through the crystallization step. Thus, controlling the number of seed crystals obtained in the seed formation step allows for controlling the total number of the secondary particles of the hydroxide obtained through the crystallization step. For example, if an amount of the mixed solution supplied in the seed formation step is increased, the number of seed crystals to be formed is increased. Accordingly, an average particle diameter of the secondary particles of the composite hydroxide after the crystallization step tends to be reduced. Further, for example, if the pH in the seed formation step is higher than the pH in the crystallization step, the formation of seed crystals is preferentially carried out than the growth of seed crystals that have been formed. This allows the seed crystals to have more uniform particle diameters, so that the seed solution with a narrow particle distribution can be obtained. Accordingly the composite hydroxide having a narrow particle distribution can be obtained. After the seed formation step, the crystallization step is carried out by supplying the mixed solution, the W solution, and the complex ion-forming solution separately and simultaneously to the seed solution while maintaining the pH of the reacted solution in a range of 10 to 13.5.

In the seed formation step, although the mixed solution and the W solution may be simultaneously supplied, the mixed solution alone is preferably supplied. As described above, tungsten is deposited as a tungsten compound with a metal element contained in the mixed solution. If both the mixed solution and the W solution are supplied, the number of seed crystals is determined not only depending on the number of moles of the metal elements supplied by the mixed solution, but also depending on the amount of deposition of the tungsten compound. On the other hand, in the case where the seeds are formed by supplying the mixed solution alone without the W solution, the number of seed crystals is determined by solely the number of moles of the metal source supplied by the mixed solution, and does not depend on the deposition of the tungsten compound. Accordingly, variation in the number of seed crystals in each manufacturing lot may be reduced.

The total number of moles of, for example, the metal elements, such as nickel, contained in the mixed solution that is supplied in the seed formation step, is, for example, 1.5% or less of the total number of moles of, for example, the metal elements, such as nickel, contained in the mixed solution that is supplied in the crystallization step. The mixed solution may be supplied simultaneously with a basic solution such that the pH of the seed solution to be obtained is maintained in a range of 10 to 13.5. Alternatively, the mixed solution may be supplied after the basic solution is supplied to the pre-reaction solution such that the pH of the reacted solution to which a predetermined amount of the mixed solution has been supplied is in a range of 10 to 13.5.

Heat-Treatment Step

In the heat-treatment step, the nickel-cobalt composite hydroxide obtained by the above-described method of producing a nickel-cobalt composite hydroxide is heat-treated under the atmosphere to remove moisture contained therein, and thus a heat-treated product is obtained. The obtained heat-treated product contains a nickel-cobalt transition metal oxide. The temperature of the heat treatment is, for example, in a range of 105° C. to 900° C., and the duration of the heat treatment is in a range of 5 hours to 30 hours.

Mixing Step

In the mixing step, heat-treated product, which contains the nickel-cobalt transition metal oxide, is mixed with a lithium compound to obtain a lithium mixture.

Examples of the mixing technique include dry-mixing the heat-treated product and the lithium compound, which are the starting materials, using a mixer or a similar device, and preparing a slurry of the starting materials and wet-mixing the slurry using a mixer such as a ball mill. Examples of the lithium compound include lithium hydroxide, lithium nitrate, lithium carbonate, and a mixture one or more of these lithium compounds.

The ratio of the total number of moles of the metal elements other than lithium to the number of moles of lithium in the lithium mixture is preferably 0.90 to 1.30. With the ratio of 0.90 or more, formation of by-products may be reduced. With the ratio of 1.30 or smaller, alkaline components present on the surface of the lithium mixture may be reduced. This may allow for reducing the moisture adsorption by the deliquescent alkaline components, so that the handling of the lithium mixture can be improved.

Calcination Step

In the calcination step, the lithium mixture obtained in the mixing step is heat-treated to obtain a lithium-transition metal composite oxide. In the calcination step, lithium contained in the lithium compound is diffused in the nickel-cobalt transition metal oxide, so that a lithium-transition metal composite oxide can be obtained.

The calcination temperature is preferably in a range of 650° C. to 990° C. With the calcination temperature of 650° C. or more, increase of an amount of unreacted lithium may be prevented. With the calcination temperature of 990° C. or less, segregation of tungsten may be reduced. In the calcination step, the highest temperature is maintained for 10 hours or more.

The calcination step is preferably carried out in the presence of oxygen, and more preferably in an atmosphere containing 10 volume % to 100 volume % of oxygen.

After calcination, the lithium transition metal oxide is subjected to treatments such as crushing, pulverizing, and dry-sieving as appropriate to obtain a positive electrode active material for a non-aqueous electrolyte secondary battery according to the present embodiment.

Positive Electrode Active Material for Non-Aqueous Electrolyte Secondary Battery The positive electrode active material according to the present embodiment contains a lithium-transition metal composite oxide represented by formula (2). The lithium-transition metal composite oxide has a layered hexagonal crystalline structure.

$$Li_pNi_{1-x-y}Co_x{}^2M_yW_zO_2 \qquad (2)$$

In formula (2), $^2M$ is at least one element selected from the group consisting of Mn, Al, Mg, Ca, Ti, Zr, Nb, Ta, Cr, Mo, Fe, Cu, Si, Sn, Bi, Ga, Y, Sm, Er, Ce, Nd, La, Cd, and Lu, and p, x, y, and z satisfy $0.95 \leq p \leq 1.2$, $0.10 \leq x \leq 0.35$, $0 \leq y \leq 0.35$, and $0 < z \leq 0.05$, respectively.

$^2M$ in formula (2) is preferably selected from at least one of Mn and Al in view of safety of a non-aqueous electrolyte secondary battery including such a positive electrode active material.

In the case where p in formula (2) is 0.95 or more, the interface resistance generated at the interface between the positive electrode surface and the electrolyte in the non-aqueous electrolyte secondary battery including the lithium transition metal oxide-containing positive electrode active material is reduced. Accordingly, the output power of the battery can be increased. Meanwhile, in the case where p is 1.2 or less, the initial discharge capacity of the non-aqueous electrolyte secondary battery in which the above-described positive electrode active material is used for the positive electrode may be improved.

In formula (2), the ranges of x, y, and z are determined in view of the charge and discharge capacity, cycle characteristics, safety, and other factors in a non-aqueous electrolyte secondary battery including the obtained lithium transition metal oxide-containing positive electrode active material. The value of x is in a range of 0.10 to 0.35. The value of y is in a range of 0 to 0.35, and preferably 0.10 to 0.35. The value of z is in a range of 0.05 or less, and preferably 0.02 or less.

Specific examples will now be described by means of Examples, but the present invention is not limited to these Examples.

EXAMPLE 1

Preparation of Solutions

A nickel sulfate solution, a cobalt sulfate solution, and a manganese sulfate solution were dissolved and mixed in water such that a molar ratio of the metal element in respective solution becomes 1:1:1 to prepare a mixed solution (at a concentration of a total of nickel ions, cobalt ions, and manganese ions of 1.7 mol/L). The total number of moles of the metal elements in the mixed solution was 474 mol. 4.7 mol of ammonium paratungstate was dissolved in an aqueous solution of sodium hydroxide to prepare a W solution (a concentration of 1.5 mol/L) having a pH of 12.3 at a liquid temperature of 25° C. For a basic aqueous solution, an aqueous solution of 25 wt % sodium hydroxide was prepared. For a complex ion-forming solution, an aqueous solution of 12.5 wt % ammonia was prepared.

Preparation of Pre-Reaction Solution

40 L of water was prepared in a reaction container, and the aqueous solution of sodium hydroxide was added thereto so as to adjust the pH to 12.5. Nitrogen gas was introduced to purge the reaction container with nitrogen to prepare a pre-reaction solution.

Seed Formation Step

The mixed solution at an amount of 4 mol as a total molar number of the metal elements including nickel, etc., was added to the pre-reaction solution while stirring the pre-reaction solution to deposit a composite hydroxide containing nickel, cobalt, and manganese.

Crystallization Step

The remaining 470 mol of the mixed solution, 4.7 mol of the W solution, the aqueous solution of sodium hydroxide, and the aqueous solution of ammonia were each supplied separately and simultaneously under a basic condition (pH: 11.3) such that the reacted solution has the nickel concentration of about 300 ppm and has the ammonium concentration of about 10000 ppm while stirring the reacted solution. Thus, particles of a composite hydroxide containing nickel, cobalt, manganese, and tungsten were deposited. The duration of supply of the mixed solution was 18 hours. The temperature of the reacted solution was controlled to be about 50° C.

Subsequently, the deposited particles underwent washing, filtering, and drying to obtain a composite hydroxide containing nickel, cobalt, manganese, and tungsten (i.e., the "nickel-cobalt composite hydroxide"). The obtained nickel-cobalt composite hydroxide was dissolved using an inorganic acid, and then subjected to a chemical analysis using inductively coupled plasma (ICP) emission spectroscopy. The composition of the obtained nickel-cobalt composite hydroxide was found to be $Ni_{0.33}Co_{0.33}Mn_{0.33}W_{0.01}(OH)_{2+a}$ ($0 \leq a \leq 0.5$).

Subsequently, the particles of the nickel-cobalt composite hydroxide were dispersed in an epoxy resin and solidified. The secondary particles were cross-sectioned using a cross section polisher, and an HAADF image and a TEM-EDX image were determined using an HAADF-STEM/EDX analyzer (manufactured by JEOL, Ltd.). All of the images were measured under the condition of accelerated voltage: 200 kV.

Figure 3:
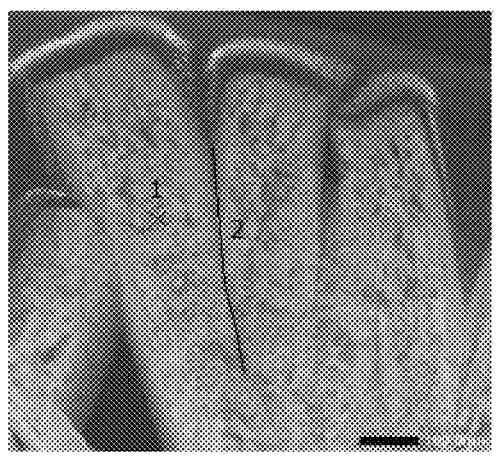
FIG. 3 is a high angle annular dark field scanning transmission electron microscope (HAADF-STEM) image of a hydroxide according to an example of the present disclosure.
Figure 4:
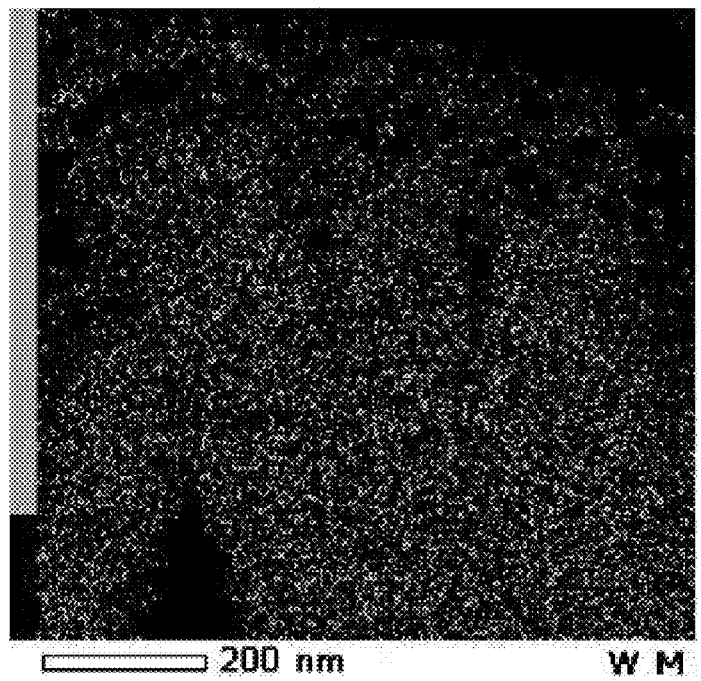
FIG. 4 is a transmission electron microscopy energy-dispersive X-ray (TEM-EDX) image of the hydroxide according to the example.

The HAADF-STEM image (hereinafter HAADF image) of the nickel-cobalt composite hydroxide according to Example 1 is shown in FIG. 3, and the TEM-EDX image is shown in FIG. 4. FIG. 3 illustrates the nickel-cobalt composite hydroxide particles, in which a plurality of primary particles forms secondary particles. In FIG. 3, an interior portion 1 of a primary particle is, for example, the region indicated by x, and a grain boundary 2 of the primary particle is, for example, the region shown in solid line. Table 1 shows the composition ratios (at %) of tungsten element in the interior portions and the grain boundaries of the primary particles of the nickel-cobalt composite hydroxide according to Example 1 determined by TEM-EDX analysis.

In Table 1, the "average composition (%)" refers to an average composition of tungsten at locations 1 to 4. The "variation" refers to a standard deviation of the composition ratios at these locations. The "variation coefficient" refers to a ratio of variation (i.e., the standard deviation) relative to the average composition.

TABLE 1

| Region | | Tungsten (at %) |
|---|---|---|
| 1 | Interior portion | 0.51 |
| 2 | Interior portion | 0.57 |
| 3 | Grain boundary | 0.39 |
| 4 | Grain boundary | 0.31 |
| Average composition (%) | | 0.45 |
| Variation | | 0.12 |
| Variation coefficient | | 0.26 |

Production of Positive Electrode Active Material

The nickel-cobalt composite hydroxide was heat-treated at 300° C. for 20 hours in the atmosphere, and collected to serve as a transition metal composite oxide containing nickel, cobalt, manganese, tungsten (i.e., the "nickel-cobalt transition metal composite oxide"). The nickel-cobalt transition metal composite oxide was then dry-mixed with lithium carbonate such that the molar ratio of the lithium carbonate to the nickel-cobalt transition metal composite oxide was 1.15, and the mixture was calcined at 930° C. for 15 hours in the atmosphere. Subsequently, through dispersion treatment, a lithium-transition metal composite oxide was obtained.

The obtained lithium-transition metal composite oxide was dissolved using an inorganic acid, and then subjected to a chemical analysis by ICP emission spectroscopy. The composition of the obtained lithium-transition metal composite oxide was determined to be $Li_{1.15}Ni_{0.33}Co_{0.33}Mn_{0.33}W_{0.01}O_2$.

Subsequently, in a similar manner as the particles of the nickel-cobalt composite hydroxide, the particles of the lithium transition metal oxide were dispersed in an epoxy resin, and solidified. Then, the secondary particles was cross-sectioned using a cross section polisher, and an HAADF image and a TEM-EDX image were obtained using an HAADF-STEM and EDX analyzer (manufactured by JEOL, Ltd.), and a scanning electron microscopy-energy dispersive x-ray (SEM-EDX) image was obtained using an scanning electron microscope and an energy dispersive x-ray analyzer (manufactured by Hitachi High Technologies Corporation). All of the images were measured under the condition of accelerated voltage: 5 kV.

Figure 5:
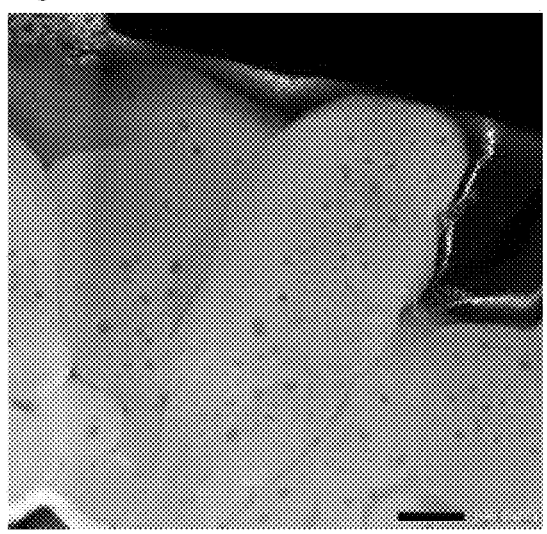
FIG. 5 is an HAADF image of a lithium-transition metal composite oxide according to the example.
Figure 6:
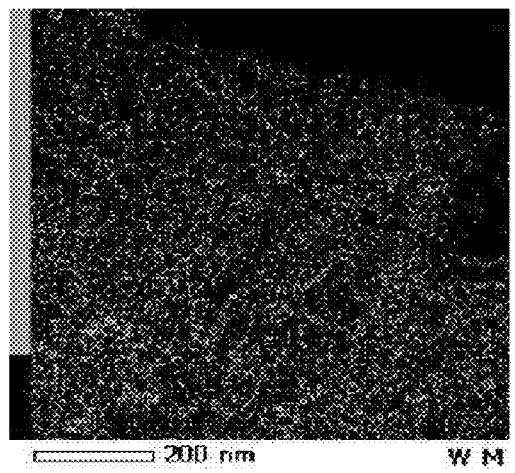
FIG. 6 is a TEM-EDX image of the lithium-transition metal composite oxide according to the example.

The HAADF image and the TEM-EDX image of the lithium-transition metal composite oxide according to Example 1 are shown in FIGS. 5 and 6, respectively. Table 2 shows the composition ratios (at %) of the tungsten element at locations in the interior portions and the grain boundaries of the primary particles of the lithium-transition metal composite oxide according to Example 1 determined by TEM-EDX analysis, and Table 3 shows the composition ratios (at %) of the tungsten element at locations in the interior portions and the grain boundaries of the primary particles determined by SEM-EDX analysis.

TABLE 2

| Region | | Tungsten (at %) |
|---|---|---|
| 1 | Interior portion | 0 |
| 2 | Interior portion | 0.19 |
| 3 | Interior portion | 0.45 |
| 4 | Grain boundary | 0.56 |
| 5 | Interior portion | 0.31 |
| 6 | Interior portion | 0.45 |
| 7 | Interior portion | 0.46 |
| 8 | Grain boundary | 0.3 |
| 9 | Grain boundary | 0.26 |
| 10 | Grain boundary | 0.12 |
| Average composition (%) | | 0.31 |
| Variation | | 0.17 |
| Variation coefficient | | 0.56 |

TABLE 3

| Region | | Tungsten (at %) |
|---|---|---|
| 1 | Interior portion | 2.26 |
| 2 | Grain boundary | 1.49 |
| 3 | Grain boundary | 1.02 |
| 4 | Interior portion | 2.09 |
| 5 | Interior portion | 1.21 |
| 6 | Grain boundary | 1.16 |
| 7 | Grain boundary | 1.05 |
| 8 | Interior portion | 0.97 |
| 9 | Grain boundary | 0.92 |
| Average composition (%) | | 1.35 |
| Variation | | 0.50 |
| Variation coefficient | | 0.37 |

COMPARATIVE EXAMPLE 1

A nickel-cobalt transition metal composite oxide was obtained under the same conditions as in Example 1 except that the W solution was not used. A lithium transition metal oxide was obtained under the same conditions as in Example 1 except that a predetermined amount of the obtained nickel-cobalt transition metal composite oxide, lithium carbonate, and a tungsten oxide (0.01 mol in the composition ratio) were dry-mixed in predetermined amounts.

The obtained lithium-transition metal composite oxide was dissolved using an inorganic acid, and then subjected to a chemical analysis using an ICP emission spectroscopy. The composition of the obtained lithium-transition metal composite oxide was determined to be $Li_{1.15}Ni_{0.33}Co_{0.33}Mn_{0.33}W_{0.01}O_2$.

Figure 7:
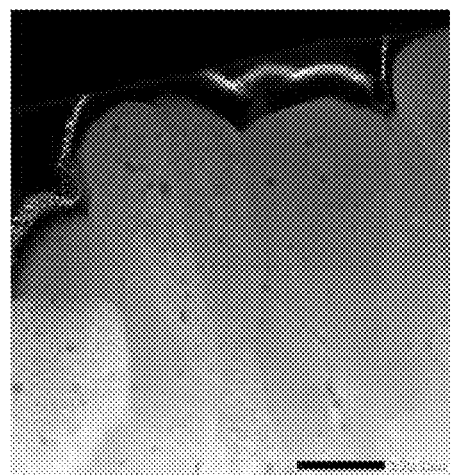
FIG. 7 is an HAADF image of a lithium-transition metal oxide according to a comparative example.
Figure 8:
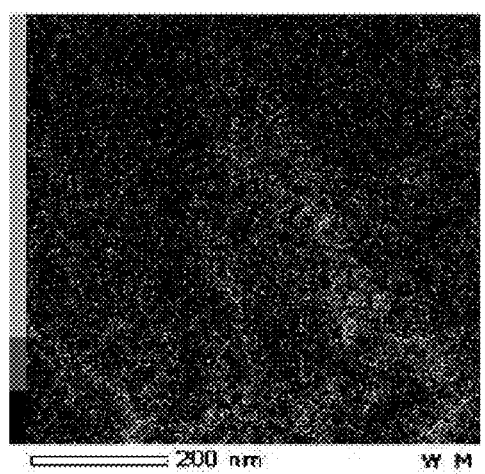
FIG. 8 is a TEM-EDX image of the lithium-transition metal oxide according to the comparative example.

Subsequently, under the same conditions as in Example 1, an HAADF image and a TEM-EDX image were determined. The HAADF image and the TEM-EDX image of the lithium-transition metal composite oxide according to Comparative Example 1 are shown in FIGS. 7 and 8, respectively. Table 4 shows the composition ratios (at %) by the TEM-EDX analysis of the tungsten element at locations in the interior portions and the grain boundaries of the primary particles of the positive electrode active material according to Comparative Example 1.

TABLE 4

| Region | | Tungsten (at %) |
|---|---|---|
| 1 | Interior portion | 0 |
| 2 | Interior portion | 0.06 |
| 3 | Grain boundary | 1.03 |
| 4 | Grain boundary | 1.51 |
| 5 | Grain boundary | 0.29 |
| 6 | Interior portion | 0.01 |
| 7 | Interior portion | 0.06 |
| 8 | Grain boundary | 0.27 |
| 9 | Grain boundary | 0.33 |
| Average composition (%) | | 0.4 |
| Variation | | 0.53 |
| Variation coefficient | | 1.33 |

COMPARATIVE EXAMPLE 2

Preparation of Solutions

A lithium-transition metal composite oxide was prepared in the same manner as in Example 1 except that 4.7 mol of ammonium paratungstate was further dissolved in a mixed solution of a nickel sulfate solution, a cobalt sulfate solution, and a manganese sulfate solution (at a concentration as a sum of nickel, cobalt, and manganese of 1.7 mol/L).

The obtained lithium-transition metal composite oxide was dissolved using an inorganic acid, and then subjected to a chemical analysis by an ICP emission spectroscopy. The composition of the obtained lithium-transition metal composite oxide was determined to be $Li_{1.15}Ni_{0.33}Co_{0.33}Mn_{0.33}W_{0.01}O_2$.

Subsequently, an SEM-EDX image was determined under the same conditions as in Example 1. Table 5 shows the composition ratios (at %) of the tungsten element at locations in the interior portions and the grain boundaries of the primary particles of the positive electrode active material determined by the SEM-EDX analysis according to Comparative Example 2.

TABLE 5

| Region | | Tungsten (at %) |
|---|---|---|
| 1 | Interior portion | 2.32 |
| 2 | Grain boundary | 1.73 |
| 3 | Grain boundary | 2.36 |
| 4 | Interior portion | 1.55 |
| 5 | Interior portion | 0.95 |
| 6 | Interior portion | 0.53 |
| 7 | Interior portion | 0.71 |
| 8 | Grain boundary | 2.08 |
| 9 | Interior portion | 0.62 |
| 10 | Interior portion | 0.77 |
| Average composition (%) | | 1.36 |
| Variation | | 0.73 |
| Variation coefficient | | 0.54 |

From Tables 1 to 5, it can be understood that the variation coefficients of the nickel-cobalt composite hydroxide and the lithium-transition metal composite oxide according to Example 1 are smaller than the variation coefficients of the lithium-transition metal composite oxide according to Comparative Examples 1 and 2. In other words, it was confirmed that tungsten is more uniformly present on the surfaces and in the interiors of the primary particles of the nickel-cobalt composite hydroxide and the lithium-transition metal composite oxide obtained according to the production method of the present Example.

Preparation of Secondary Battery

Secondary batteries for evaluation each including the positive electrode active material obtained in each of Example 1, Comparative Example 1, and Comparative Example 2 were respectively prepared in the manner as described below.

Non-Aqueous Electrolyte Secondary Battery

A non-aqueous electrolyte secondary battery for each of the secondary batteries for evaluation was prepared in the manner as described below.

Preparation of Positive Electrode 85 parts by weight of respective positive electrode active material, 10 parts by weight of acetylene black, and 5.0 parts by weight of polyvinylidene fluoride (PVDF) were dispersed in N-methyl-2-pyrrolidone (NMP) to prepare a positive electrode slurry. The obtained positive electrode slurry was applied on an aluminum foil, dried, compression-molded by a roll press machine, and cut into a predetermined size to obtain a positive electrode plate.

Preparation of Negative Electrode 97.5 parts by weight of artificial graphite, 1.5 parts by weight of carboxymethylcellulose (CMC), and 1.0 parts by weight of styrene-butadiene rubber (SBR) were dispersed in water to prepare a negative electrode slurry. The obtained negative electrode slurry was applied to a copper foil, dried, compression-molded by a roll press machine, and cut into a predetermined size to obtain a negative electrode plate.

Preparation of Non-Aqueous Electrolyte

Ethylene carbonate (EC) and methyl ethyl carbonate (MEC) were mixed at a volume ratio of 3:7 to obtain a solvent. Into the obtained mixed solvent, lithium hexafluorophosphate ($LiPF_6$) was dissolved to have a concentration of 1 mol/L to obtain a non-aqueous electrolyte.

Assembly of Batteries for Evaluation

Lead electrodes were connected to the aluminum foil of the positive electrode plate and the copper foil of the negative electrode plate, respectively, followed by vacuum drying at 120° C. Subsequently, a separator formed from porous polyethylene was arranged between the positive electrode and the negative electrode, all of which were then placed in a laminated bag-shaped pack. Then, moisture adsorbed to each member was removed by vacuum drying at 60° C. After the vacuum drying, the above-described non-aqueous electrolyte was poured into the laminated pack and sealed to obtain a laminated non-aqueous electrolyte secondary battery.

Solid Electrolyte Secondary Battery

A solid electrolyte secondary battery for each of the secondary batteries for evaluation was prepared in the manner as described below.

Preparation of Solid Electrolyte

Lithium sulfide and phosphorus pentasulfide were weighed under the argon atmosphere to have a molar ratio of 7:3. The weighed substances were pulverized and mixed in an agate mortar to obtain a sulfide glass, and used as a solid electrolyte.

Preparation of Positive Electrode 60 parts by weight of respective positive electrode active material, 36 parts by weight of the solid electrolyte, and 4 parts by weight of a vapor grown carbon fiber (VGCF) were mixed to obtain a positive electrode composite material.

Preparation of Negative Electrode

An indium foil with a thickness of 0.05 mm was cut into a circle with a diameter of 11.00 mm to obtain a negative electrode.

Assembly of Batteries for Evaluation

Into a cylindrical outer mold with an inner diameter of 11.00 mm, a columnar lower mold with an outer diameter of 11.00 mm was inserted from the lower side of the outer mold. The upper end of the lower mold is fixed at an intermediate portion of the outer mold. In this state, 80 mg of the solid electrolyte was injected onto the upper end of the lower mold from the upper side of the outer mold. After the injection, a columnar upper mold with an outer diameter of 11.00 mm was inserted from the upper side of the outer mold. After the insertion, a pressure of 90 MPa was applied from above the upper mold to mold the solid electrolyte, so that a solid electrolyte layer was obtained. After the molding, the upper mold was taken out from the upper side of the outer mold, and 20 mg of the positive electrode composite material was injected onto the upper portion of the solid electrolyte layer from the upper side of the outer mold. After the injection, the upper mold was inserted again, to which a pressure of 360 MPa was applied to mold the positive electrode composite material to obtain a positive electrode layer. After the molding, the upper mold was fixed, and the lower mold was unfixed and taken out from the lower side of the outer mold. Subsequently, the negative electrode was injected onto the lower portion of the solid electrolyte layer from the lower side of the outer mold. After the injection, the lower mold was inserted again, and a pressure of 150 MPa was applied from below the lower mold to mold the negative electrode, so that a negative electrode layer was obtained. With the pressure being applied, the lower mold was fixed, and a positive electrode terminal was connected to the upper mold, and a negative electrode terminal was connected to the lower mold to obtain an all-solid secondary battery.

Evaluation of Battery Characteristics

Characteristics of the secondary batteries for evaluation obtained as above were evaluated in the manner as described below.

Non-Aqueous Electrolyte Secondary Battery

Initial Discharge Capacity

The test secondary batteries were discharged under the conditions of a charge potential of 4.3 V, a discharge potential of 2.75 V, and a discharge load of 0.2 C (1 C is a current load that completes discharge in 1 hour). The discharge capacity at this time of each battery was defined as its initial discharge capacity Qd (mAh/g).

Initial Efficiency

The secondary batteries for evaluation were charged under the condition of a charge potential of 4.3V. The charging capacity of each battery was at this time was referred to as its initial charging capacity. The value of the initial discharge capacity of each battery was divided by the value of its initial charging capacity to determine the initial efficiency Qe (%), and the initial characteristics were evaluated. The higher the initial efficiency, the better the initial characteristics.

High Temperature High Voltage Storage Characteristics

The batteries for evaluation were placed in a constant temperature bath at 25° C., and constant current-constant voltage charge was carried out under the conditions of a full charge voltage of 4.5 V, a charging rate of 0.2 C, and a charging duration of 10 hours. After charging, constant current-constant voltage discharge was carried out at a discharge voltage of 2.75 V, and a discharge rate of 0.2 C. After discharging, recharging was carried out, and then the batteries for evaluation were transferred to a constant temperature bath at 60° C. In the constant temperature bath, the batteries were stored for 50 hours while performing trickle-charging at a charging voltage of 4.5V, and a charging rate of 0.2 C. After storage, the trickle-charging was stopped, and the batteries were moved backed to the temperature controlled bath at 25° C. and allowed to cool. After sufficient cooling, constant current-constant voltage discharge was carried out under the conditions of a discharge voltage of 2.75 V and a discharge rate of 0.2 C, and then a discharge capacity Qs (mAh/g) was measured. With a high Qs, the battery has good high-temperature storage characteristics.

TABLE 6

|  | Qd (mAh/g) | Qe (%) | Qs (mAh/g) |
| --- | --- | --- | --- |
| Example 1 | 164 | 92 | 173 |
| Comparative Example 1 | 161 | 91 | 169 |
| Comparative Example 2 | 163 | 92 | — |

From Table 6, it is confirmed that Example 1 is superior to Comparative Examples 1 and 2 in terms of initial discharge capacity, and is also superior to Comparative Example 1 in terms of initial efficiency and high temperature high voltage storage characteristics.

A non-aqueous electrolyte secondary battery including such a lithium-transition metal composite oxide-containing positive electrode active material serving as positive electrode can be suitably used for a power source for, for example, electric tools and electric vehicles. A solid electrolyte secondary battery including such a lithium-transition metal composite oxide-containing positive electrode active material as positive electrode does not include non-aqueous electrolyte, and thus can be suitably used as a power source for electric apparatuses for a large output under harsh thermal and mechanical conditions, such as a standby power source for a power plant.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method of producing a nickel-cobalt composite hydroxide, comprising:
    preparing a first solution containing nickel ions and cobalt ions;
    preparing a second solution containing tungsten ions and having a pH of 10 or more;
    preparing a third solution containing a complex ion-forming factor;
    preparing a liquid medium having a pH in a range of 10 to 13.5;
    supplying a portion of the first solution to the liquid medium to obtain a seed solution;
    supplying the first solution, the second solution, and the third solution separately and simultaneously to the seed solution to obtain a reacted solution, the reacted solution having a pH in a range of 10 to 13.5; and
    obtaining the nickel-cobalt composite hydroxide containing nickel, cobalt, and tungsten from the reacted solution.

2. The method according to claim 1, wherein a concentration of nickel ions in the reacted solution is in a range of 10 ppm to 1000 ppm.

3. The method according to claim 2, wherein a duration of the supplying the first solution is 12 hours to 60 hours.

4. The method according to claim 3, wherein the seed solution contains a composite hydroxide that contains nickel and cobalt.

5. The method according to claim 2, wherein the seed solution contains a composite hydroxide that contains nickel and cobalt.

6. The method according to claim 1, wherein a duration of the supplying the first solution is 12 hours to 60 hours.

7. The method according to claim 6, wherein the seed solution contains a composite hydroxide that contains nickel and cobalt.

8. The method according to claim 1, wherein the seed solution contains a composite hydroxide that contains nickel and cobalt.

9. The method according to claim 1, wherein the nickel-cobalt composite hydroxide has a composition represented by formula (1):

$$Ni_{1-x-y}Co_x{}^1M_yW_z(OH)_{2+p} \qquad (1)$$

wherein $^1M$ is at least one element selected from the group consisting of Mn, Al, Mg, Ca, Ti, Zr, Nb, Ta, Cr, Mo, Fe, Cu, Si, Sn, Bi, Ga, Y, Sm, Er, Ce, Nd, La, Cd, and Lu, and x, y, z, and p satisfy $0.01 \leq x \leq 0.35$, $0 \leq y \leq 0.35$, $0 < z < 0.05$, and $0 \leq p \leq 0.5$, respectively.

10. The method according to claim 9, wherein $^1M$ is at least one of Mn and Al.

11. A method of producing a positive electrode active material for a non-aqueous electrolyte secondary battery, comprising:

heat-treating the nickel-cobalt composite hydroxide, which is obtained in the method according to claim 1, in the presence of oxygen to obtain a heat-treated product;

mixing the heat-treated product and a lithium compound to obtain a lithium mixture; and heat-treating the lithium mixture to obtain a lithium-transition metal composite oxide containing nickel and cobalt and having a layered structure.

12. The method according to claim 11, wherein the lithium-transition metal composite oxide has a composition represented by formula (2) below:

$$Li_pNi_{1-x-y}Co_x{}^2M_yW_zO_2 \qquad (2)$$

wherein $^2M$ is at least one element selected from the group consisting of Mn, Al, Mg, Ca, Ti, Zr, Nb, Ta, Cr, Mo, Fe, Cu, Si, Sn, Bi, Ga, Y, Sm, Er, Ce, Nd, La, Cd, and Lu; and p, x, y, z satisfy $0.95 \leq p \leq 1.2$, $0.10 \leq x \leq 0.35$, $0 \leq y \leq 0.35$, and $0 < z \leq 0.05$, respectively.

13. The method according to claim 12, wherein $^2M$ is at least one of Mn and Al.

14. The method according to claim 1, wherein the seed solution does not contain tungsten.

15. The method according to claim 1, wherein a pH in supplying a portion of the first solution to the liquid medium to obtain the seed solution is higher than a pH in obtaining the nickel-cobalt composite hydroxide containing nickel, cobalt, and tungsten from the reacted solution.

* * * * *